Sept. 24, 1929. J. C. BLAIR 1,729,147
PROCESS AND APPARATUS FOR PRODUCING SHEET GLASS
Filed Jan. 30, 1924
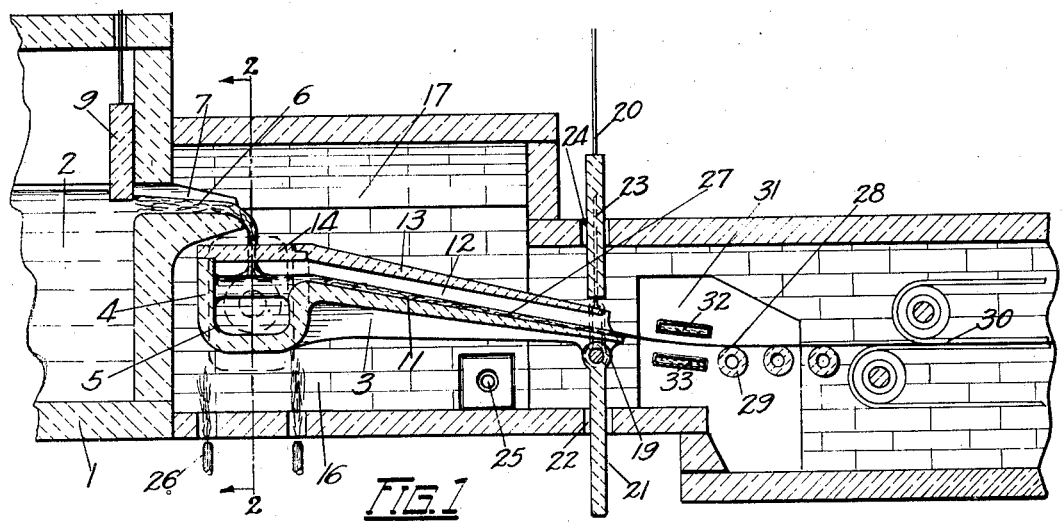
Fig.1
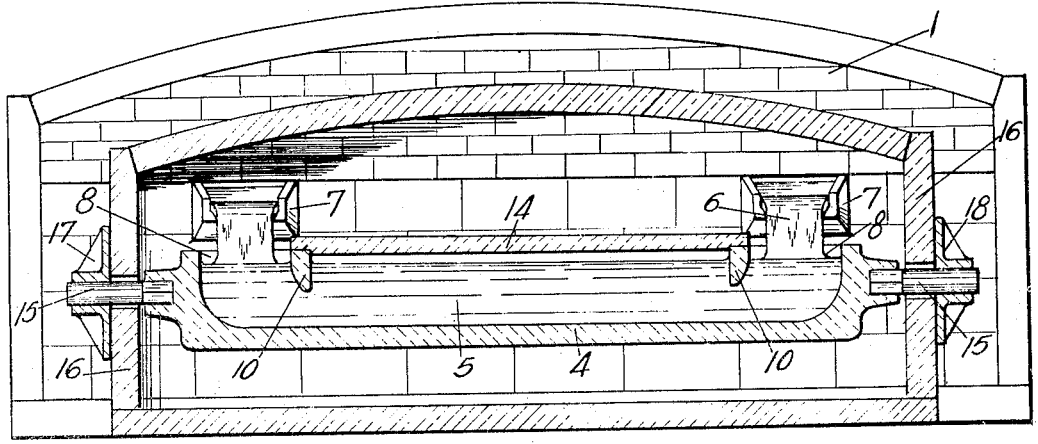
Fig.2
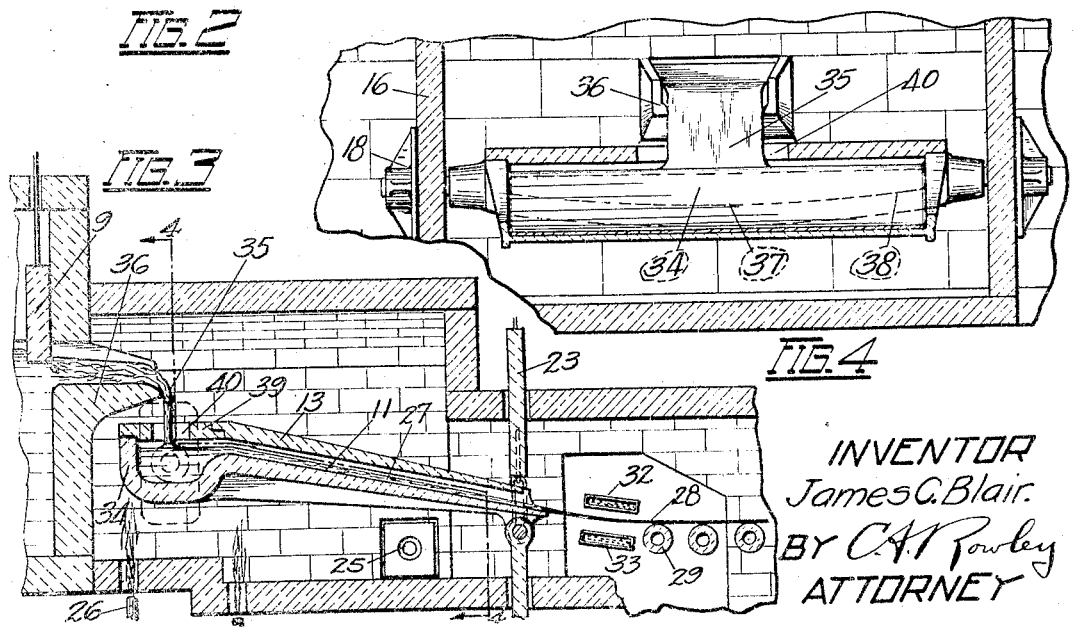
Fig.3
Fig.4
INVENTOR
James C. Blair.
BY C. A. Rowley
ATTORNEY Patented Sept. 24, 1929

1,729,147

UNITED STATES PATENT OFFICE

JAMES C. BLAIR, OF TOLEDO, OHIO, ASSIGNOR TO LIBBEY-OWENS GLASS COMPANY, OF TOLEDO, OHIO, A CORPORATION OF OHIO

PROCESS AND APPARATUS FOR PRODUCING SHEET GLASS

Application filed January 30, 1924. Serial No. 689,394.

This invention relates to improvements in the art of drawing sheet glass, and more particularly to an improved process and apparatus for flowing molten glass in a thin stream down an inclined slab and then drawing this glass from the supply in sheet form.

According to this invention, the slab is provided at its higher end with a recess or receptacle for first receiving the molten glass which flows thereinto from the tank or other source of supply. This molten glass overflows at one side of the recess or receptacle onto the higher end of the downwardly inclined upper surface of the slab, the glass flowing down the slab in a thin even stream and being drawn away from the lower portion thereof in the form of a glass sheet. The recess at the upper end of the slab serves to distribute the molten glass evenly across all portions of the upper surface thereof. The upper face of the slab down which the molten stream flows, as well as all of the molten glass within the receptacle, except that below the inlet openings for receiving molten glass from the tank, are enclosed by suitable cover-plates to protect the molten glass from dirt or the direct contact of heating gases, and also to keep this glass at a more uniform temperature at all points across the width of the slab. The entire slab and receptacle are mounted in and surrounded by a heated chamber whereby the glass is maintained at the proper working temperature. The slab is pivotally mounted adjacent its upper end, and the lower discharge end thereof is adjustably supported so that the inclination of the sheet-forming surface of the slab may be varied as desired.

Other objects and advantages of the invention will be apparent from the following detailed description of certain approved froms of the apparatus.

In the accompanying drawings:

Fig. 1 is a longitudinal vertical section through one form of the apparatus.

Fig. 2 is a transverse vertical section taken substantially on the line 2—2 of Fig. 1.

Fig. 3 is a view similar to Fig. 1, showing a modified form of the apparatus.

Fig. 4 is a transverse vertical section taken substantially on the line 4—4 of Fig. 3.

Referring first to Figs. 1 and 2, at 1 is indicated the discharge end of a tank furnace in which is produced the supply of molten glass 2 for feeding the sheet-forming apparatus.

The slab 3, preferably made of suitable refractory material, is formed at its upper end with an enlarged portion 4 in which is a recess or receptacle 5 for receiving and holding the pool of molten glass. Molten glass from tank 1 flows out in regulated streams 6 through the spouts 7 in the side wall of the tank, and this glass is received in the open upper end portions 8 of receptacle 5. By raising or lowering suitable cut-off gates or shear-cakes 9 adjacent the entrances to spouts 7, the quantity of glass in stream 6 may be regulated as desired.

The glass-receiving end portions of recess or receptacle 5 are cut off from the main central portion of the recess by cross partitions 10 extending from the upper edge of the slab part way down into the recess. The molten glass must flow under these partitions 10 to reach the central portion of the recess. The main sheet-forming portion of slab 3, down the upper face 11 of which the molten glass flows to form the sheet, is of a width approximately equal to the distance between partitions 10, and is provided with vertical side glass-retaining flanges 12 which form substantial continuations of the partitions 10. A cover-plate 13 rests upon the flanges 12, and a second cover-plate 14 rests on the partitions 10 and the upper wall of receptacle 4. The two plates 13 and 14 enclose all of the molten glass in the receptacle and on the slab with the exception of the two glass-receiving openings 8 at the ends of the receptacle.

Metallic studs or trunnions 15 project from the ends of receptacle 4 through the side walls 16 of the heating chamber 17 which completely surrounds the slab, and these trunnions are journaled in suitable bearings 18 on the outer sides of these walls. The lower discharge end of slab 3 is carried by a yoke 19 suspended by cables 20 from suitable adjusting mechanism. A closure gate 21 hangs from the lower portion of this yoke 19 through a passage 22 in the bottom wall of the chamber 17, and a second closure 23 is supported by the cables or rods 20 above the discharge end of slab 3, projecting through passage 24 in the top of the enclosing structure. By adjusting the rods or cables 20 up or down, the slab 3 may be swung about the pivots 15 at its upper end and the inclination of the plane surface 11 down which the glass flows may be varied as desired. At the same time the gates 21 and 23 will substantially close one end of chamber 17. The other end of chamber 17 is closed by the adjacent wall of tank 1, so that the entire slab 3, including the recessed portion or receptacle at its upper end, is surrounded by the heated atmosphere in chamber 17. Suitable burners, such as indicated at 25 and 26 maintain the desired heated atmosphere in this chamber.

It will be noted that practically all of the molten glass in and on the slab 3 is protected by the slab itself, and the cover-plates 13 and 14 from the direct action of the heating gases within the chamber 17. Receptacle 4 with its cover-plate 14 forms an enclosed chamber for the pool of molten glass which overflows down the enclosed passage formed by slab 3 and cover-plate 13. This will protect the sheet-forming glass from dirt or soot, and at the same time all portions of the glass will be maintained at a more uniform temperature, since the heat must reach the glass by radiation or conduction through the enclosing walls.

The stream of molten glass 27 which flows down the passage 11 in the slab is drawn away in the form of a glass sheet 28 over suitable supporting rollers 29 and through the drawing and flattening mechanism 30 into the leer. The plastic sheet just after leaving the slab is exposed to the cooling influence of the air through openings 31 in the enclosing structure, and, if necessary, auxiliary cooling members 32 and 33 may be positioned adjacent the upper and lower faces of sheet 28 at this point.

In the somewhat simpler form of the apparatus disclosed in Figs. 3 and 4, the recess or receptacle 34 at the upper end of the slab is shorter, and shallower than the recess 5 described above, and the supply of molten glass is received in the upper central portion of the recess in the form of a single downflowing stream 35, flowing from spout 36 in tank 1. Preferably the shallow recess 34 is deeper at the central glass-receiving portion 37 than it is adjacent the ends 38. The shallower ends 38 will assist in giving an equal distribution or overflow of glass from this recess 34 down the upper surface 11 of the slab. The cover-plate 39 for the recess 34 is provided with a central aperture 40 through which the stream of molten glass 35 flows down into the receptacle 34. In all other respects this form of the apparatus is quite similar to that already described in connection with Figs. 1 and 2.

It will be noted that in either form of the apparatus, the molten glass after being supplied to the upper end of the slab, is distributed equally to all portions of the sheet-flowing surface 11 of the slab, down which it flows and is then drawn away in the form of a sheet, and that during all of this forming process the molten glass is protected from dirt and the direct contact of heating gases, although surrounded at all times by a heated atmosphere for maintaining the glass in the proper working condition. By varying the inclination of the slab, the volume of the supplying streams 6 or 35, and the temperature in chamber 17, the size and rate of flow of the stream passing down the slab may be adjusted to secure the desired strength of glass sheet.

Claims:

1. The process of forming sheet glass, consisting in supplying molten glass to a pool, causing the pool to overflow at one edge down an inclined member, and drawing away this glass in the form of a sheet.

2. The process of forming sheet glass, consisting in supplying molten glass to a pool, causing the pool to overflow at one edge down an inclined member, surrounding the pool and inclined member with a heated atmosphere, and drawing away this glass in the form of a sheet.

3. The process of forming sheet glass, consisting in supplying molten glass to the interior of a receptacle having a spillway at one edge thereof, flowing glass from this spillway down an inclined plane surface, and drawing this glass away in the form of a sheet.

4. The process of forming sheet glass, consisting in supplying molten glass to an enclosed pool, causing the pool to overflow at one edge down an enclosed inclined passage, and drawing away this glass in the form of a sheet.

5. The process of forming sheet glass, consisting in supplying molten glass to an enclosed pool, causing the pool to overflow at one edge down an enclosed inclined passage, surrounding the pool and passage with a heated atmosphere, and drawing away this glass in the form of a sheet.

6. In an apparatus for producing sheet glass, an inclined slab down the upper face of which molten glass is adapted to flow to form the sheet, the slab having a glass-receiving recess at its higher end.

7. In an apparatus for producing sheet glass, an inclined slab down the upper face of which molten glass is adapted to flow to form the sheet, the slab being formed at its higher end with a receptacle for receiving molten glass which flows therefrom down the slab.

8. In an apparatus for producing sheet glass, an inclined slab down the upper face of which molten glass is adapted to flow to form the sheet, the slab being formed at its higher end with a receptacle for receiving molten glass which flows therefrom down the slab, and a cover-plate carried by the slab above the flowing glass.

9. In an apparatus for producing sheet glass, an inclined slab down the upper face of which molten glass is adapted to flow to form the sheet, the slab being formed at its higher end with a receptacle for receiving molten glass, the receptacle being in open communication adjacent its ends with a source of molten glass, and having one side edge adapted to overflow glass down the upper face of the slab.

10. In an apparatus for producing sheet glass, an inclined slab down the upper face of which molten glass is adapted to flow to form the sheet, the slab being formed at its higher end with a receptacle for receiving molten glass, the receptacle being in open communication adjacent its ends with a source of molten glass, and having one side edge adapted to overflow glass down the upper face of the slab, and a cover-plate for all of the glass on the slab, except at the receiving ends of the receptacle.

11. In an apparatus for producing sheet glass, an inclined substantially flat slab, means at the upper end of the slab for receiving molten glass and distributing it as a thin even flow down the upper face of the slab, and means for drawing away this flow in the form of a sheet of glass.

12. In an apparatus for producing sheet glass, an inclined substantially flat slab, a heated chamber surrounding the slab, means at the upper end of the slab for receiving molten glass and distributing it as a thin even flow down the upper face of the slab, and means for drawing away this flow in the form of a sheet of glass.

13. In an apparatus for producing sheet glass, an inclined substantially flat slab, a receptacle formed at the upper end of the slab for receiving molten glass, the molten glass flowing from the receptacle as a thin even stream down the upper face of the slab, and means for drawing away this flow in the form of a sheet of glass.

14. In an apparatus for producing sheet glass, an inclined slab down the upper face of which molten glass is adapted to flow to form a sheet, the slab having a receptacle for molten glass formed at its higher end, in combination with a heated chamber surrounding the slab.

15. In an apparatus for producing sheet glass, an inclined slab down the upper face of which molten glass is adapted to flow to form a sheet, the slab having a receptacle for molten glass formed at its higher end, in combination with a heated chamber surrounding the slab, means for flowing molten glass into the receptacle and means for drawing away the sheet from the discharge end of the slab.

16. In an apparatus for producing sheet glass, a refractory member having an enclosed chamber for molten glass at one end, and an enclosed inclined passage with a plane lower face down which molten glass flows from the receptacle.

17. In an apparatus for producing sheet glass, a refractory member having an enclosed chamber for molten glass at one end, and an enclosed inclined passage with a plane lower face down which molten glass flows from the receptacle, and a heated chamber in which the refractory member is mounted.

18. In an apparatus for producing sheet glass, a refractory member having an enclosed chamber for molten glass at one end, and an enclosed inclined passage with a plane lower face down which molten glass flows from the receptacle, in combination with means for feeding molten glass to the chamber, and means for drawing away the glass in sheet form from the discharge end of the passage.

19. In an apparatus for producing sheet glass, a refractory member having an enclosed chamber for molten glass at one end, and an enclosed inclined passage with a plane lower face down which molten glass flows from the receptacle, in combination with a heated chamber in which the member is mounted, means for feeding molten glass to the chamber, and means for drawing away the glass in sheet form from the discharge end of the passage.

20. The process of forming sheet glass, consisting in flowing molten glass from a main supply body into a relatively smaller pool separated therefrom, causing the pool to overflow down an inclined member, and in drawing the glass in sheet form from the lower end of said member.

21. In an apparatus for producing sheet glass, a furnace containing a mass of molten glass and having a discharge outlet, a receptacle positioned adjacent said outlet for receiving molten glass therefrom, an inclined member associated with said receptacle, the molten glass being adapted to flow from said receptacle down said member, and means for drawing the glass in sheet form from the lower end of said member.

Signed at Toledo, in the county of Lucas and State of Ohio, this 26th day of January, 1924.

JAMES C. BLAIR.